United States Patent
Lee et al.

(10) Patent No.: US 11,618,433 B1
(45) Date of Patent: Apr. 4, 2023

(54) HYBRID ELECTRIC VEHICLE AND METHOD OF TRANSMISSION CONTROL FOR THE SAME

(71) Applicants: Hyundai Motor Company, Seoul (KR); Kia Corporation, Seoul (KR)

(72) Inventors: Seul Gi Lee, Hwaseong-si (KR); Soo Bang Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/862,017

(22) Filed: Jul. 11, 2022

(30) Foreign Application Priority Data

Nov. 26, 2021 (KR) .......... 10-2021-0165089

(51) Int. Cl.
| | |
|---|---|
| *B60W 30/19* | (2012.01) |
| *B60W 20/15* | (2016.01) |
| *B60W 20/30* | (2016.01) |
| *B60W 10/08* | (2006.01) |
| *B60W 10/06* | (2006.01) |
| *B60W 10/11* | (2012.01) |

(52) U.S. Cl.
CPC .......... *B60W 20/15* (2016.01); *B60W 10/06* (2013.01); *B60W 10/08* (2013.01); *B60W 10/11* (2013.01); *B60W 20/30* (2013.01); *B60W 30/19* (2013.01); *B60W 2510/0657* (2013.01); *B60W 2510/081* (2013.01); *B60W 2510/083* (2013.01); *B60W 2540/10* (2013.01); *B60W 2710/0666* (2013.01); *B60W 2710/083* (2013.01); *B60W 2710/1005* (2013.01)

(58) Field of Classification Search
CPC ...... B60W 20/15; B60W 10/06; B60W 10/08; B60W 10/11; B60W 20/30; B60W 2510/0657; B60W 2510/081; B60W 2510/083; B60W 2540/10; B60W 2710/0666; B60W 2710/083; B60W 2710/1005; B60W 30/19
USPC ............................................................ 477/3
See application file for complete search history.

(56) References Cited

U.S. PATENT DOCUMENTS

| | | | | |
|---|---|---|---|---|
| 6,009,365 | A | * | 12/1999 | Takahara ............... B60K 6/543 477/118 |
| 10,449,948 | B2 | * | 10/2019 | Kim ...................... B60W 20/15 |
| 2014/0303825 | A1 | * | 10/2014 | Tsuda ...................... F16H 63/50 180/65.265 |
| 2018/0170166 | A1 | * | 6/2018 | Sugiyama ............. B60K 6/547 |

(Continued)

*Primary Examiner* — Roger L Pang
(74) *Attorney, Agent, or Firm* — Morgan, Lewis & Bockius LLP (57) ABSTRACT

In a hybrid electric vehicle, gear shifting delay and odd feeling when shifting gears, due to the accelerator pedal being depressed after an upshift being determined according to a release of the pedal, may be prevented. A method for controlling a transmission of the hybrid electric vehicle, includes determining a gear shifting type when a predetermined gear shifting condition is satisfied; determining an engine operation mode when the gear shifting type is power-off upshift; determining, when the engine operation mode is a predetermined mode according to an air-fuel ratio condition, a compensation value according to at least one of a motor speed, an under-charging-limit available motor torque, and an engine operation point in the predetermined mode; and applying the compensation value to an engine torque.

15 Claims, 5 Drawing Sheets

(56) References Cited

U.S. PATENT DOCUMENTS

2018/0170346 A1* 6/2018 Katsumata .......... B60W 50/082
2021/0171011 A1* 6/2021 Park ..................... B60W 10/08

* cited by examiner

HYBRID ELECTRIC VEHICLE AND METHOD OF TRANSMISSION CONTROL FOR THE SAME

The present application claims priority to Korean Patent Application No. 10-2021-0165089, filed on Nov. 26, 2021, the entire contents of which is incorporated herein for all purposes by this reference.

BACKGROUND OF THE PRESENT DISCLOSURE

Field of the Present Disclosure

The present disclosure relates to a hybrid electric vehicle in which gear shifting delay and odd feeling when shifting gears, due to the accelerator pedal being depressed after an upshift determined according to a release of the pedal, may be prevented, and a method for controlling a transmission for the same.

DESCRIPTION OF RELATED ART

Recently, with high interest in environment, the number of eco-friendly vehicles on the road is rising. The eco-friendly vehicle is referred to as an electrified vehicle, and a typical example thereof is a Hybrid Electric Vehicle (HEV).

The hybrid electric vehicle can reduce the exhaustion gas and improve the gas mileage by operating selectively an electric motor and an engine according to a driving situation.

Figure 1:
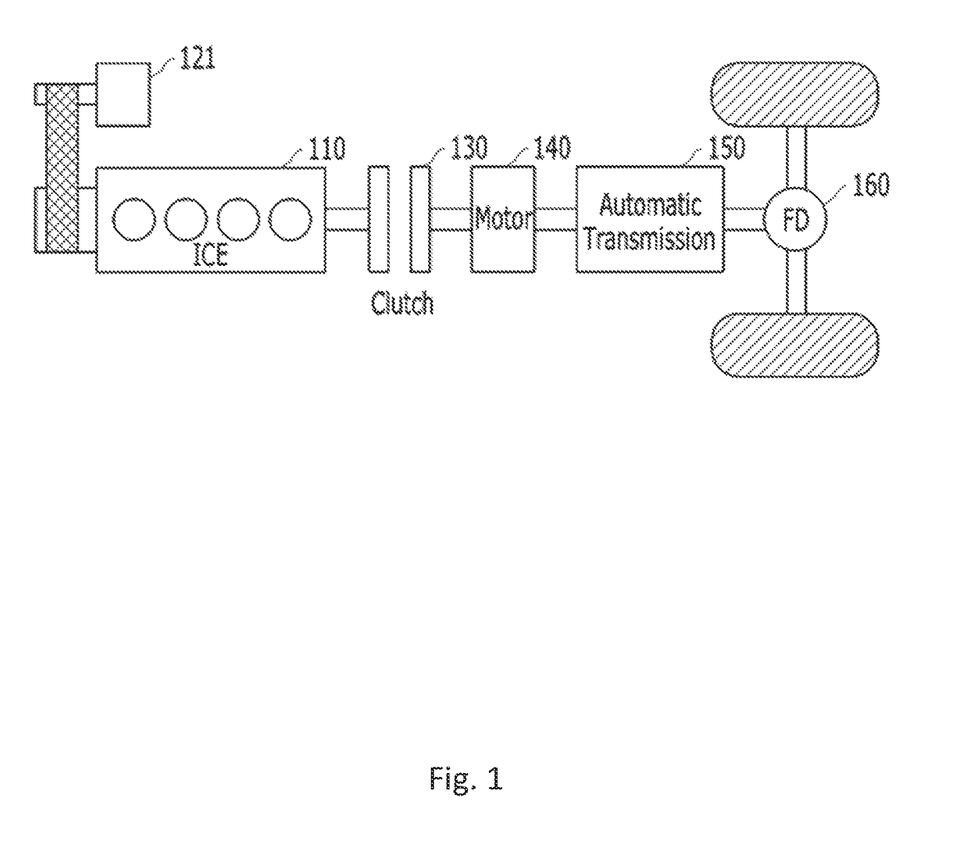
FIG. 1 represents an example of a conceptual structure of a general hybrid electric vehicle.

FIG. 1 represents an example of a conceptual structure of the powertrain apparatus of a hybrid electric vehicle.

In reference to FIG. 1, a powertrain apparatus of a parallel type hybrid electric vehicle including an electric (driving) motor 140 and an engine clutch 130 between an internal combustion engine (ICE) 110 and a transmission 150 is shown.

Generally, in the present type of vehicle, if a driver depress the accelerator pedal (i.e., accelerator pedal sensor being on) after starting the engine, first, the motor 140 is driven by use of battery power with the engine clutch 130 open (disengaged), and thus the wheels are rotated by the driving power of the motor (140) via the transmission 150 and a final drive (FD) 160 (i.e., the vehicle runs in EV mode). If greater driving power is needed as the vehicle accelerates, an auxiliary motor (or a starter-generator motor 121) is operated to drive the engine 110.

Accordingly, when a difference of speed between the engine 110 and the motor 140 comes within a predetermined range, the engine clutch 130 is engaged and thus the engine 110 and the motor 140 drive the vehicle together (i.e., transition from EV mode to HEV mode). When a predetermined condition for turning off the engine is satisfied, the engine clutch 130 is disengaged and the engine 110 stops (i.e., transition from HEV mode to EV mode). At the present moment, a battery is charged by the motor 140 using driving force of the wheels, which is so called generating of brake energy or regenerative brake. Accordingly, because the starter-generator motor 121 is configured as a starter motor when starting the engine and as a generator to regenerate rotational energy of the engine after the engine started or when the engine turned off, it may be referred to as a Hybrid Starter Generator (HSG).

Generally, a multi-speed transmission or a transmission with a multi-plate clutch, e.g., a dual clutch transmission (DCT) may be used for the transmission 150.

When a hybrid electric vehicle provided with a multi-speed transmission accelerates from a stop as the accelerator pedal depressed, upshifts from $1^{st}$ speed to $2^{nd}$ and then from $2^{nd}$ to $3^{rd}$ are made sequentially. This type (i.e., shift class) of upshift due to an acceleration may be referred to as Power On Upshift (or forward driving upshift). On the other hand, the upshift made along with the accelerator pedal being released may be referred to as Power Off Upshift.

The power-off upshift in a hybrid electric vehicle provided with a multi-speed transmission (AT/DCT) is performed in a similar way to that in a general vehicle only provided with an engine. In the hybrid electric vehicle, however, speediness and robustness of the gear-shift is improved through a speed control of the input side of the transmission 150 for improving the gear-shift feeling.

However, due to a condition of a low state of charge (SOC) value of the battery or a high drive load, or to maintain the input torque of the transmission 150 low because of the nature of the power-off upshift under a condition of maintaining part load operation of the engine due to the accelerator pedal being depressed during a power-off upshift, a control to charge the battery through the motor 140 with a large portion of the torque of the engine is performed. The part load operation refers to controlling the engine operation at an optimum operation point of the brake specific fuel consumption (BSFC) with the air-fuel ratio $\lambda$ being controlled to be 1. In case of part load operation of an engine, the torque corresponding to the optimum operation point of the engine is comparatively large, so if the engine torque is not reduced by a sufficient amount by the regenerative torque of the motor due to an application of a limit of charging power of the battery, the input of the transmission will be a positive valued torque.

Because gear shifting, generally, in a multi-speed transmission is performed in a way that the fluid pressure for a current gear position is fully released and the pressure for a target gear position is applied at a speed of the input side of the transmission synchronized to the speed of the target gear position (i.e., upper gear position of the current), the speed of the input side for the target gear position needs to be lowered from the one for the current position for the synchronization. The input side speed, however, is not lowered smoothly since the input torque becomes positive during the shifting process due to the limit of the charging torque of the motor 140 under the situation of the above described part load operation of the engine 110, and thus it results in a problem of a long preparation for the shifting and delay of the gear shifting.

Not only that, a problem of odd feeling during the shifting process also occurs because it is the fluid pressure for the connection, not the input torque, which makes the actual speed shift accompanied by a change of momentum. In other words, when a fluid pressure for the target gear position is applied under a situation where the input side speed fails to be synchronized for the target gear position (i.e., the speed is faster) due to the input torque being positive, then a torque transmitted according to the application of the fluid pressure is transmitted to the output side to cause a problem of making an acceleration feeling.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hybrid electric vehicle in which gear shifting delay and odd feeling when shifting gears, due to the accelerator pedal being depressed after an upshift being determined according to a release of the pedal, may be prevented, and a method for controlling a transmission for the same.

Additional objects of the present disclosure will be set forth in part in the description which follows and in part will become apparent to those having ordinary skill in the art upon examination of the following or may be learned from practice of the present disclosure. The objects of the present disclosure may be realized and attained by the structure particularly pointed out in the written description and claims hereof as well as the appended drawings.

A method for controlling a transmission of a hybrid electric vehicle, according to various exemplary embodiments of the present disclosure, includes: determining a gear shifting type when a predetermined gear shifting condition is satisfied; determining an engine operation mode when the gear shifting type is power-off upshift; determining, when the engine operation mode is a predetermined mode according to an air-fuel ratio condition, a compensation value according to at least one of a motor speed, an under-charging-limit available motor torque, and an engine operation point in the predetermined mode; and applying the compensation value to an engine torque.

For example, the predetermined mode includes a part load mode, and the engine operation point in the predetermined mode includes a BSFC optimal operation point.

For example, the predetermined mode is applied when an accelerator pedal is depressed after a transmission control for the power-off upshift is initiated.

For example, the method further includes controlling a sum of the engine torque to which the compensation value is applied and a motor torque to be negative according to a shift phase.

For example, the controlling is performed regardless of an after-intervention transmission input torque command transmitted from a transmission control unit.

For example, an initiation time point of the controlling corresponds to a time point when a release control of a fluid pressure for a current gear position is completed.

For example, the determining of the compensation value is performed with reference to a predetermined table.

A computer readable recording medium according to various exemplary embodiments of the present disclosure has a program for implementing one of the methods described above therein.

A hybrid electric vehicle according to various exemplary embodiments of the present disclosure includes: a first control unit configured to control a transmission and to determine a gear shifting type when a predetermined gear shifting condition is satisfied; and a second control unit configured to determine an engine operation mode when the gear shifting type is power-off upshift, determine, when the engine operation mode is a predetermined mode according to an air-fuel ratio condition, a compensation value according to at least one of a motor speed, an under-charging-limit available motor torque, and an engine operation point in the predetermined mode, and apply the compensation value to an engine torque.

For example, the predetermined mode includes a part load mode, and the engine operation point in the predetermined mode includes a BSFC optimal operation point.

For example, the predetermined mode is applied when an accelerator pedal is depressed after a transmission control for the power-off upshift is initiated.

For example, the second control unit is configured to control a sum of the engine torque to which the compensation value is applied and a motor torque to be negative according to a shift phase.

For example, the second control unit is configured to control the sum to be negative regardless of an after-intervention transmission input torque command transmitted from a transmission control unit.

For example, an initiation time point of the control of the sum to be negative corresponds to a time point when a release control of a fluid pressure for a current gear position is completed.

For example, the second control unit is configured to determine the compensation value with reference to a predetermined table.

According to the above described embodiments of the present disclosure, because a compensation torque is applied to the engine torque when the engine is under a part load control state during a power-off upshift, the shifting process may be fast completed and accordingly odd feeling due to an acceleration feeling is prevented.

Additional advantages of the present disclosure will be set forth in part in the description which follows and in part will become apparent to those having ordinary skill in the art upon examination of the following or may be learned from practice of the present disclosure. Other advantages of the present disclosure may be realized and attained by the structure particularly pointed out in the written description and claims hereof as well as the appended drawings.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings, and the same or similar elements will be provided the same reference numerals regardless of reference symbols, and redundant description thereof will be omitted. In the following description, the terms "module" and "unit" for referring to elements are assigned and used interchangeably in consideration of convenience of explanation, and thus, the terms per se do not necessarily have different meanings or functions. Furthermore, in describing the exemplary embodiments included in the present specification, when it is determined that a detailed description of related publicly known technology may obscure the gist of the exemplary embodiments included in the present specification, the detailed description thereof will be omitted. The accompanying drawings are used to help easily explain various technical features and it may be understood that the exemplary embodiments presented herein are not limited by the accompanying drawings. Accordingly, the present disclosure should be construed to extend to any alterations, equivalents and substitutes in addition to those which are set out in the accompanying drawings.

Although terms including ordinal numbers, such as "first", "second", etc., may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural form unless the context clearly dictates otherwise.

In the exemplary embodiment, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

Furthermore, the term "unit" or "control unit" included in the names of a hybrid control unit (HCU), a motor control unit (MCU), etc. is merely a widely used term for naming a controller that controls a specific vehicle function, and does not mean a generic functional unit. For example, each controller may include a communication device that communicates with another controller or a sensor to control a function assigned thereto, a memory that stores an operating system, a logic command, input/output information, etc., and one or more processors that perform determination, calculation, decision, etc. necessary for controlling a function assigned thereto.

Before describing a method of controlling a transmission, a control scheme of a hybrid electric vehicle will be described in advance.

Figure 2:
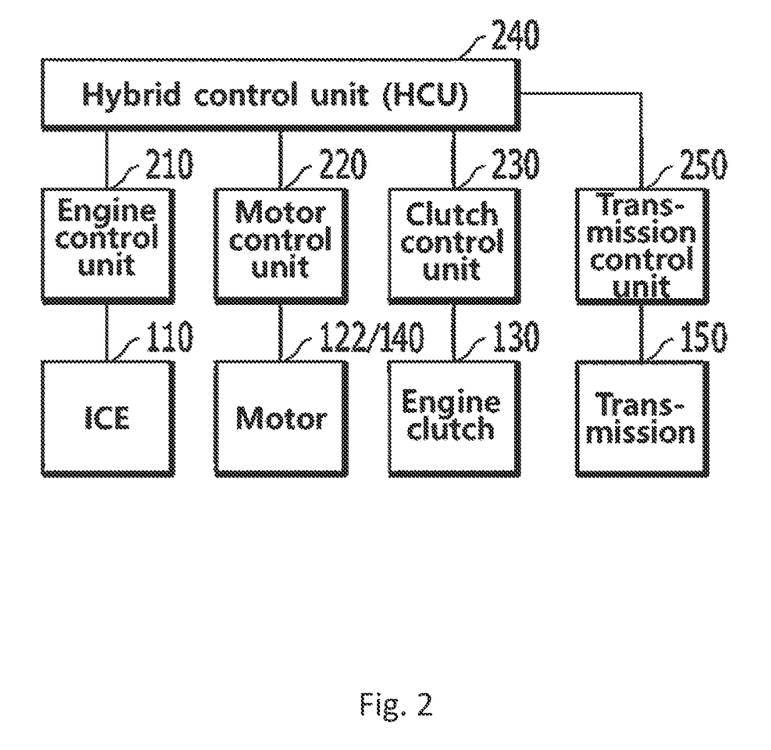
FIG. 2 represents an example of a control scheme of a hybrid electric vehicle according to various exemplary embodiments of the present disclosure.

FIG. 2 represents an example of a control scheme for a hybrid electric vehicle according to various exemplary embodiments of the present disclosure. FIG. 2 may be a control scheme which is assumed to control the hybrid powertrain apparatus described in FIG. 1.

In reference to FIG. 2, in a hybrid electric vehicle to which embodiments of the present disclosure are applicable, the internal combustion engine 110 may be controlled by an engine control unit 210, the starter-generator motor 122 and the driving motor 140 by a motor control unit (MCU) 220 for their torques, and the engine clutch 130 by a clutch control unit 230, respectively. In here, the engine control unit 210 is also called an engine management system (EMS). Also, the transmission 150 is controlled by a transmission control unit 250.

Each control unit may be connected to a hybrid control unit (HCU) 240 which controls overall procedures for mode transitions as an upper control unit thereof, and provide, according to a control thereof, information necessary for the changing of the drive mode and controlling the engine clutch in shifting a gear, and/or information necessary for controlling an engine stop, or perform an action according to a control signal.

For example, the hybrid control unit 240 determines whether to change modes between EV and HEV or CD and CS according to a driving state of the vehicle. To the present end, the hybrid control unit is configured to determine when to disengage the engine clutch 130 and performs fluid control for the disengagement. Also, the hybrid control unit 240 may determine the state (Lock-up, Slip, Open, etc.) of the engine clutch, and control when to stop injecting fuel into the engine 110. Also, the hybrid control unit may control regenerating of rotational energy of the engine by transmitting to the motor control unit 220 a torque command for controlling the torque of the starter-generator motor 122 to stop the engine. Furthermore, when controlling a mode transition of the drive mode, the hybrid control unit 240 can control lower control units for a judgment of mode transition conditions and the transition.

Of course, the above described relationship between the control units and the function/distinguishing of each control unit are only examples, and it is obvious to a person having ordinary skill in the art that they are not also limited to the names. For example, the hybrid control unit 240 may be implemented to be replaced by any one of other control units which is made to further provide the function, or by two or more control units to which the function is distributed.

The above described structure of FIG. 2 is only an example, and it is obvious to a person having ordinary skill in the art that a hybrid electric vehicle applicable to various exemplary embodiments of the present disclosure is not limited to the described structure.

Before describing a method for controlling a transmission according to various exemplary embodiments of the present disclosure, the problem resulted from a part load operation control of an engine in a general power-off upshift process will be detailed with reference to FIG. 3.

Figure 3:
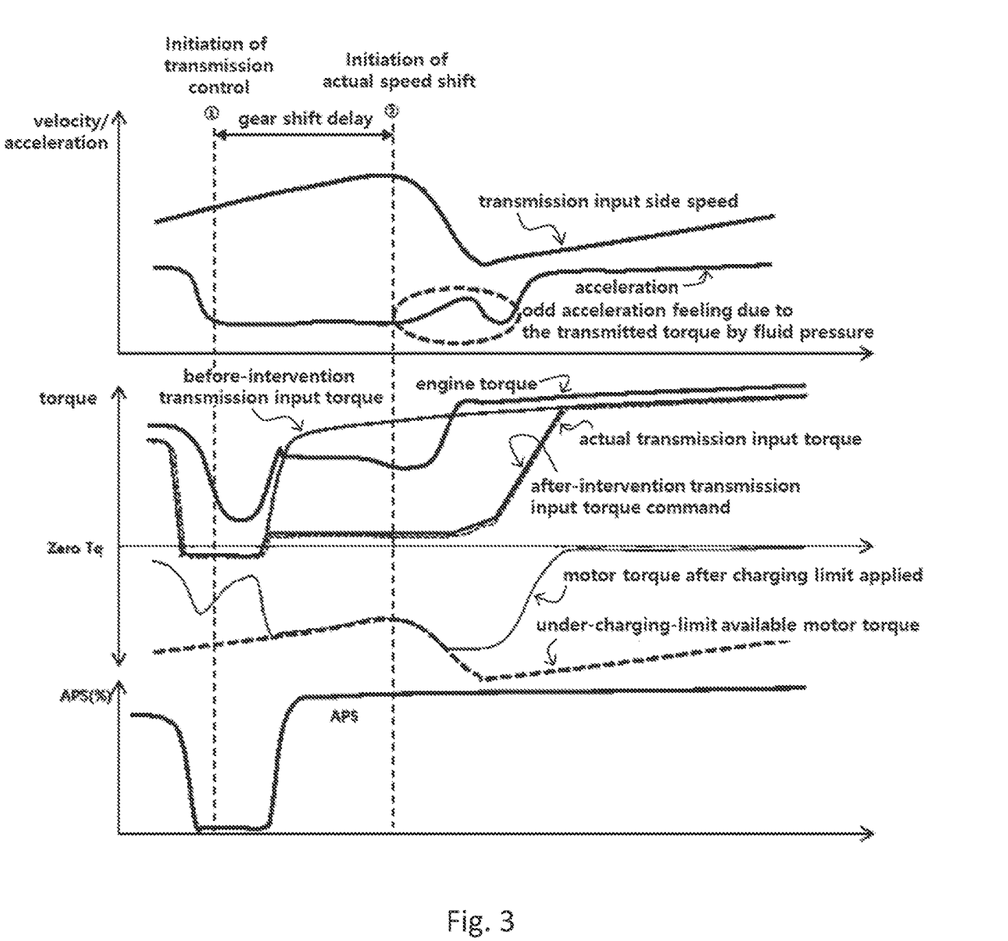
FIG. 3 is a drawing for explaining a problem of a general power-off upshift process.

FIG. 3 is a drawing for explaining a problem of a general power-off upshift process.

With reference to FIG. 3, the graphs correspond to a situation where a driver depresses again the accelerator pedal after fully releasing (APS off) during operating the pedal. If the gear position of the transmission is not changed, then the input torque (i.e., motor torque+engine torque) of the transmission would be controlled to be a request torque corresponding to an APS value like a before-intervention transmission input torque, the transmission control unit 250 determines a power-off upshift and starts it due to the accelerator pedal being fully released. According thereto, the transmission control unit 250 transmits an after-intervention transmission input torque command to the hybrid control unit 240, and the hybrid control unit 240 assigns a motor torque and an engine torque so that an actual transmission input torque is applied to the input side of the transmission according to the request from the transmission control unit 250. At the present moment, since the accelerator pedal is depressed after the power-off upshift has been initiated, the operation mode of the engine becomes part load operation for maintaining the air-fuel ratio as 1 and the engine torque is determined to be the one corresponding to the optimal operation point at which the efficiency is best with respect to BSFC for the optimal fuel efficiency. Such torque at the optimal operation point of the engine is largely high, and the hybrid control unit 240 controls the motor 140 to charge the battery to follow the after-intervention transmission input torque command of the transmission control unit 250. The charging torque of the motor 140, however, is limited according to hardware characteristics such as the higher revolutions per minute (rpm) and the lower max. torque of the motor. Accordingly, the engine torque is controlled to be an engine torque determined with a motor torque after a charging limit applied taken into consideration to follow the after-intervention transmission input torque command.

However, since the actual transmission input torque is a positive value, the shifting is delayed until the fluid pressure for the target gear position is built up to cause the input side speed of the transmission to be varied, and also it accelerates due to the torque transmitted during the actual speed shifting to cause odd acceleration feeling due to a transmitted torque by fluid pressure.

In more detail, the transmission input side speed is lowered (i.e., actual speed shift) by the transmission input torque, due to the characteristics of the control of power-off upshift, when the transmission gear of the current gear position is completely released (disengaged) by a release control of the fluid pressure for the current gear position. Accordingly, the gear shifting to the target gear position is completed by the engagement to the target gear position by the fluid pressure applied when the transmission input side speed is synchronized to the speed for the target gear position.

However, since the actual transmission input torque is a positive value, even though the release of the current gear position is completed through the release control of the fluid pressure, the gear shifting is delayed due to the transmission input side speed being not lowered. Also, since it is not the actual transmission input torque but the fluid-pressure transmitted torque by the application of the fluid pressure for the target gear position which cause the lowering (actual speed shift) of the transmission input side speed, it cannot help that the odd acceleration feeling occurs due to the torque transmission to the output side due to the occurrence of the transmitted torque.

To reduce such a problem, it is suggested in various exemplary embodiments of the present disclosure to apply, to the engine torque, a compensation value with an under-charging-limit available torque considered when a part load operation control of the engine performed during a power-off upshift, so that the gear shifting is rapidly made.

It is preferable here that the transmission input torque becomes negative by the engine torque with the compensation value applied at the initiation of the actual speed shift (i.e., at the moment when the release control of the fluid pressure for the current gear position is completed) for a quick drop of the transmission input side speed. To the present end, the transmission control unit 250 may transmit a signal indicating the initiation of the actual speed shifting to the hybrid control unit 240. For example, the signal indicating the initiation of the actual speed shift may be a signal for shift phase, and this is only an example without being limited thereto.

Also, the compensation value may be determined considering a motor under-charging-limit available torque (or power), a motor RPM and a default engine operation point (i.e., BSFC optimal operation point when the air-fuel ratio attained to be 1) in a part load control. In other words, the compensation value may be determined so that the sum of the under-charging-limit available torque ((−) torque) varied by a motor RPM and the engine torque with the compensation value considered (i.e., 'torque of part-load default operation point–the compensation value,' (+) torque) becomes negative so that the transmission input torque is negative at the initiation of the actual speed shift.

In an actual application, the compensation value may be determined with reference to a predetermined table provided with motor RPM and default engine operation point in a part-load control, however without being limited thereto. Furthermore, at the moment when a compensation value being applied to an engine torque, the hybrid control unit 240 may control a compensation-value-considered engine torque to be output regardless of the after-intervention transmission input torque command.

Figure 4:
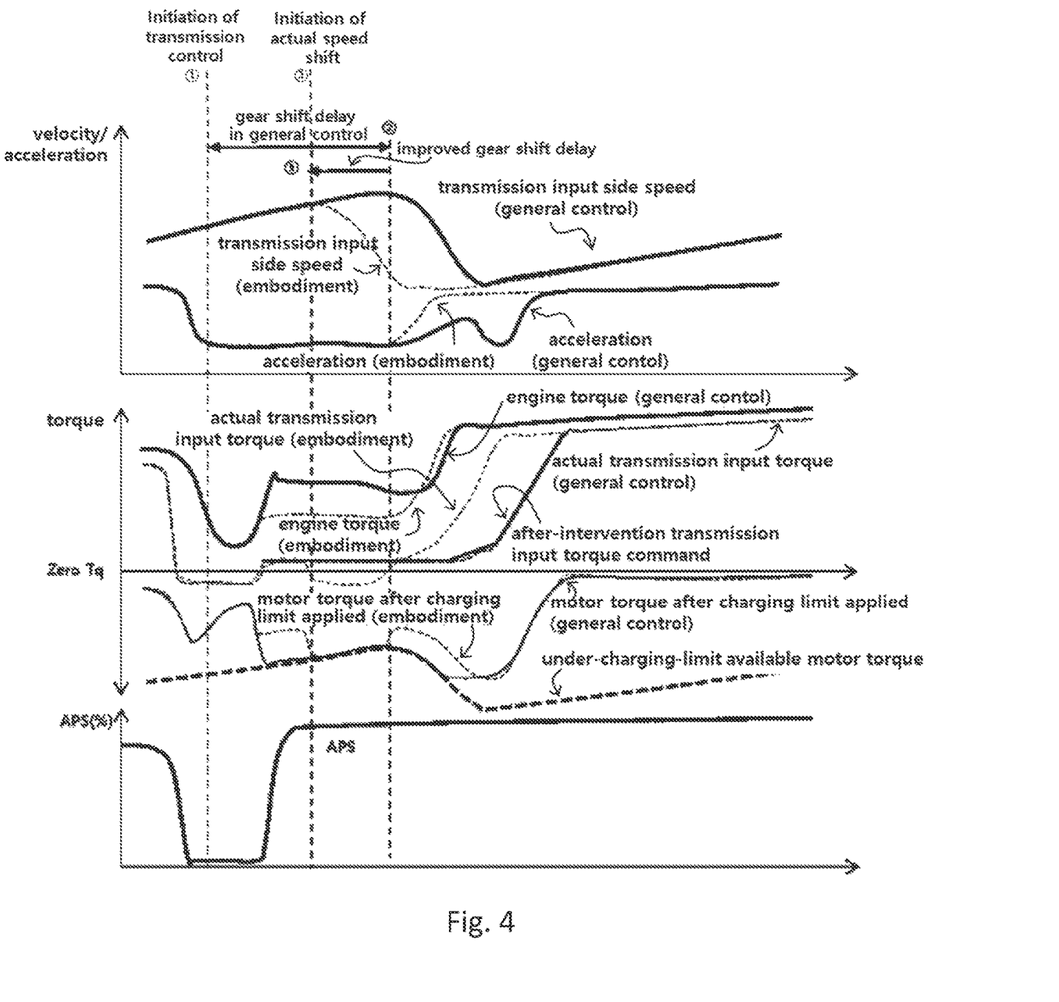
FIG. 4 represents an example of a power-off upshift process according to various exemplary embodiments of the present disclosure.

With reference to FIG. 4, the effect of the above described transmission control according to the exemplary embodiment of the present disclosure is detailed compared to the general transmission control described with reference to FIG. 3.

FIG. 4 represents an example of a power-off upshift process according to various exemplary embodiments of the present disclosure.

In FIG. 4, it is assumed that a driver depresses the accelerator pedal again after releasing (APS off).

In the general control, the torque of BSFC optimal operation point due to the part load control of the engine 110 is high, and the motor torque is limited by the under-charging-limit available motor torque, and thus the actual transmission input torque is positive.

According to the exemplary embodiment of the present disclosure, however, a compensation value is additionally applied to lower the engine torque additionally with a real-time transmission input side speed (i.e., identical to the motor RPM), an under-charging-limit available motor torque and an engine torque considered.

Accordingly, since the engine torque of the present embodiment is controlled low compared to the engine torque of the general control, when controlling the motor torque, enough under-charging-limit available motor torque may be secured, and since it is possible to control the actual transmission input torque to be negative with the enough under-charging-limit available motor torque, the initiation time of the actual speed shift is moved ahead. Thus, the delay of gear shifting may be improved.

In other words, in the exemplary embodiment of the present disclosure, the under-charging-limit available torque of the motor is sufficiently secured by lowering the operation torque of the engine from the time point ① when a power-off upshift control is initiated to the time point when it is determined that the fluid pressure for the current gear position is completely released (i.e., the time point ③ of the actual speed shift initiation, able to be determined by the shift phase as described above). Thereafter, because the actual transmission input torque of the present embodiment is controlled to be behaved into the negative region through a charging torque control for the motor like the motor torque after a charging limit applied of the present embodiment for the occurrence of the variation (actual speed shift) of the transmission input side speed, the subject of the actual speed shift becomes the input torque, so that the delay of gear shifting is improved. Not only that, because the subject of the actual speed shift becomes the input torque and thus the transmission input side speed is synchronized to that for the target gear position, the acceleration feeling, caused by the transmitted torque due to the fluid pressure applied for the target gear position like under the general control, may be prevented.

Figure 5:
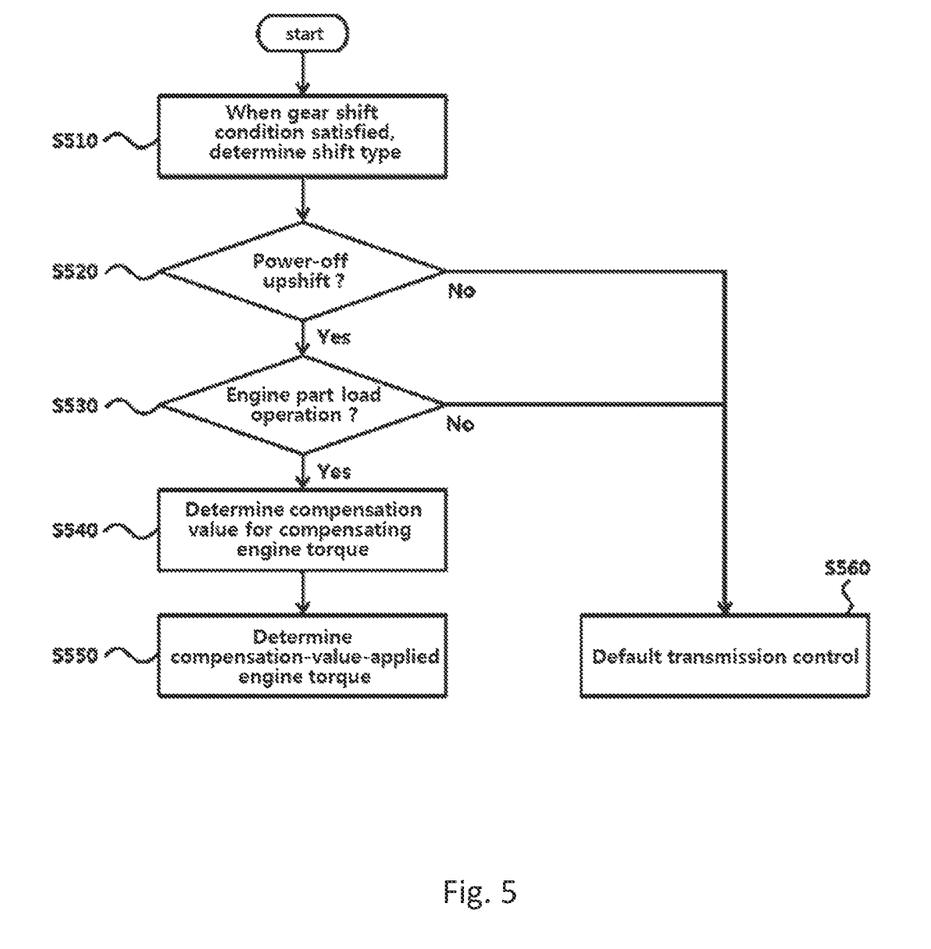
FIG. 5 represents an example of a gear shifting control process of a hybrid electric vehicle according to various exemplary embodiments of the present disclosure.

The above description of the transmission control ca be represented by the flowchart of FIG. 5.

FIG. 5 represents an example of a gear shifting control process of a hybrid electric vehicle according to various exemplary embodiments of the present disclosure.

With respect to FIG. 5, in the transmission control unit 250, the gear shifting type may be determined when a gear shifting condition is satisfied in step 510. Whether or not the gear shifting condition is satisfied may be determined with respect to a gear shifting map predefined according to vehicle speed and depressed amount of the accelerator pedal, without being limited thereto.

In case where it is determined in step 520 that the gear shifting type is power-off upshift, the hybrid control unit 240 determines in step 530 whether the operation mode of the engine is part load operation.

In case where the operation mode of the engine is the part load operation, it may mean that the accelerator pedal is depressed after a transmission control for the power-off upshift initiated, without being limited thereto. For example, the part load operation may be performed when the battery is charged with the driving power of the engine due to a low SOC value of the battery. In the instant case, the torque limit for the motor due to the battery state is, of course, relatively weak and thus sufficient charging torque of the motor 140 may be secured, however, even in the present situation, though the compensation value for the engine torque is only small compared to the case of the accelerator pedal being depressed, the exemplary embodiment of the present disclosure can still be applied.

In case where it is determined in step 530 that the operation mode of the engine is the part load operation, the hybrid control unit 240 may determine a compensation value for the compensation of the engine torque in step 540.

As described above, the compensation value may be determined considering a motor's under-charging-limit available torque (or power), a motor RPM and a default engine operation point (i.e., BSFC optimal operation point when the air-fuel ratio attained to be 1) in a part load control.

Once the compensation value determined, the hybrid control unit 240 may determine the engine torque with the compensation value considered in step 550, and apply it in the gear shifting process.

If it is determined in step 520 that the gear shifting type is not in power-off upshift, or it is determined in step 530 that the operation mode of the engine is not the part load operation, the default transmission control 5560 is performed.

During the shift process, the motor torque may be controlled so that the transmission input torque becomes negative at the time point of the initiation of the actual speed shift despite the under-charging-limit available motor torque by maintaining the engine torque low until before the initiation of the actual speed shift through the above described compensation-value-applied engine torque control.

On the other hand, the present disclosure described above may be embodied as computer-readable code on a medium in which a program is recorded. The computer-readable medium includes all types of recording devices in which data readable by a computer system is stored. Examples of the computer-readable medium include a Hard Disk Drive (HDD), a solid-state drive (SSD), a silicon disk drive (SDD), a ROM, a RAM, a CD-ROM, a magnetic tape, a floppy disk, an optical data storage device, etc. Therefore, the above detailed description should not be construed as restrictive and should be considered as illustrative in all respects. The scope of the present disclosure should be determined by a reasonable interpretation of the appended claims, and all modifications within the equivalent scope of the present disclosure are included in the scope of the present disclosure.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling a transmission of a hybrid electric vehicle, the method comprising:
   determining, by a controller, a gear shifting type when a predetermined gear shifting condition is satisfied;
   determining, by the controller, an engine operation mode when the gear shifting type is power-off upshift;
   when the engine operation mode is a predetermined mode according to an air-fuel ratio condition, determining, by the controller, a compensation value according to at least one of a motor speed, an under-charging-limit available motor torque, and an engine operation point in the predetermined mode; and applying the compensation value to an engine torque.

2. The method of claim 1,
wherein the predetermined mode includes a part load mode, and
wherein the engine operation point in the predetermined mode includes a brake specific fuel consumption (BSFC) optimal operation point.

3. The method of claim 1, wherein the predetermined mode is applied when an accelerator pedal is depressed after a transmission control for the power-off upshift is initiated.

4. The method of claim 1, further including:
controlling, by the controller, a sum of the engine torque to which the compensation value is applied and a motor torque to be negative according to a shift phase.

5. The method of claim 4, wherein the controlling is performed regardless of an after-intervention transmission input torque command transmitted from a transmission control unit.

6. The method of claim 4, wherein an initiation time point of the controlling corresponds to a time point when a release control of a fluid pressure for a current gear position is completed.

7. The method of claim 1, wherein the determining of the compensation value is performed with reference to a predetermined table.

8. A computer readable recording medium with a program for implementing the method of claim 1 recorded therein.

9. A hybrid electric vehicle comprising:
a first control unit configured to control a transmission and to determine a gear shifting type when a predetermined gear shifting condition is satisfied; and
a second control unit configured to determine an engine operation mode when the gear shifting type is power-off upshift, determine, when the engine operation mode is a predetermined mode according to an air-fuel ratio condition, a compensation value according to at least one of a motor speed, an under-charging-limit available motor torque, and an engine operation point in the predetermined mode, and apply the compensation value to an engine torque.

10. The vehicle of claim 9,
wherein the predetermined mode includes a part load mode, and
wherein the engine operation point in the predetermined mode includes a brake specific fuel consumption (BSFC) optimal operation point.

11. The vehicle of claim 9, wherein the predetermined mode is applied when an accelerator pedal is depressed after a transmission control for the power-off upshift is initiated.

12. The vehicle of claim 9, wherein the second control unit is configured to control a sum of the engine torque to which the compensation value is applied and a motor torque to be negative according to a shift phase.

13. The vehicle of claim 12, wherein the second control unit is configured to control the sum to be negative regardless of an after-intervention transmission input torque command transmitted from a transmission control unit.

14. The vehicle of claim 12, wherein an initiation time point of the control of the sum to be negative corresponds to a time point when a release control of a fluid pressure for a current gear position is completed.

15. The vehicle of claim 9, wherein the second control unit is configured to determine the compensation value with reference to a predetermined table.

* * * * *